June 16, 1953
A. H. PFUND
2,642,367
METHOD OF PROTECTING LENSES
Original Filed Jan. 9, 1950
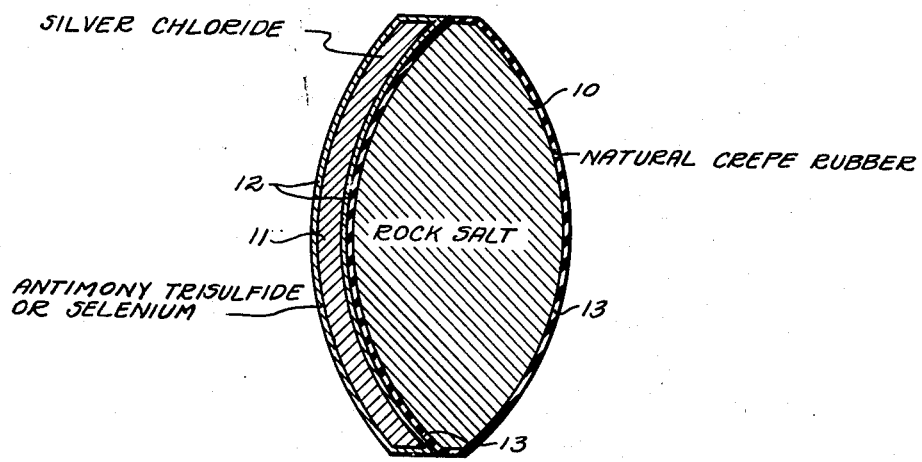
INVENTOR.
AUGUST H. PFUND.
BY
ATTORNEYS Patented June 16, 1953

2,642,367

UNITED STATES PATENT OFFICE 2,642,367

METHOD OF PROTECTING LENSES

August Herman Pfund, Baltimore, Md., assignor to the United States of America as represented by the Secretary of War Original application January 9, 1947, Serial No. 721,078. Divided and this application March 27, 1950, Serial No. 152,204

3 Claims. (Cl. 117—106)

The invention described herein may be manufactured and used by or for the Government for governmental purposes without payment to me of any royalty thereon.

This application is a division of my co-pending application Serial No. 721,078 filed January 9, 1947, which is now Patent 2,512,257 of June 20, 1950. Briefly stated the invention comprises a method of making rock salt and silver chloride lenses insensitive respectively to water and to ultra-violet light by coating said lenses while warm with a product produced by melting crepe rubber and thereafter eliminating solids from the product or coating a rock salt lens first with alkyd resin varnish and then applying to the lens a sheet of polyethylene oxide resin or rubber hydrochloride. In the case of the silver chloride lenses, these are protected by coating them in vacuo with antimony trisulfide or amorphous selenium thickly enough to give the lens a deep orange or red color by transmitted light.

An object is to provide a method for protecting rock salt plates or lenses against water while still retaining their infra-red transparency.

Another object is to provide a method for light-proofing silver chloride lenses against ultra-violet rays while still retaining their infrared transparency for rays up to 12 mu in wave length.

Another object is to provide a method for joining rock salt and silver chloride lenses.

In the drawing 10 is a lens of rock salt and 11 is a lens of silver chloride. 12 is a coating of antimony tri-sulfide ($Sb_2S_3$) or of amorphous selenium ($Se_2$). Such coating is applied to a dry, polished AgCl lens, which is free from grease, by vacuum distillation. The coating material is volatilized in a high vacuum to which the AgCl lens is also subjected, so that the evaporated $Sb_2S_3$ or $Se_2$ will condense upon the cool lens. The deposition is continued until the lens becomes a deep orange or red color by transmitted light. A silver chloride lens so protected will not turn black after several hours exposure to a mercury arc lamp of ordinary intensity.

The rock salt lens 10 also has a coating 13. It is applied by the addition of a few drops of a solution known as Stock Solution A, the preparation and composition of which is about to be described. It is adapted to act as a cement as well as a water-resisting compound, thereby insuring the adhesion of the AgCl lens 11 to the rock salt lens 10. The cement or coating 13 is squeezed out to a very thin layer by using a glass tube as a roller. The two lenses are then brought together before the cement solidifies. It is also permissible to coat the $Sb_2S_3$ or $Se_2$ coated AgCl lens with the cement 13 before bringing the lenses together, provided the excess coating material is squeezed out when the lenses are brought together.

STOCK SOLUTION A

Some pale natural crepe-rubber is melted down in a crucible. The resultant dark, viscous mass remains fluid even at room temperature. To remove solid particles, some benzene is added. From this solution, the solid particles settle out. The liquid is then decanted. This liquid material is applied to the rock-salt lens 10 and the latter is then heated to 60°–70° C. to drive off the benzene. After cooling to room temperature, the AgCl lens or its equivalents, which will now be disclosed, are mounted on the rock-salt lens as previously described.

STOCK SOLUTION B

There is prepared a saturated solution of paraffin (M. P. 60°–68° C.) in benzene at a temperature of 30° C. Of this solution, 60 parts are added to 40 parts of self-curing cement of the type which contains a vulcanization accelerator capable of vulcanizing the rubber at ordinary temperatures. If flakes of paraffin appear, more benzene is added to form a homogeneous solution.

Equivalents of the silver chloride lens

*Equivalent A.*—The rock salt lens 10 is first protected on its edges by coating them with varnish made by the interaction of glycerol and phthalic anhydride, and which is an alkyd type resin varnish of the grade used to seal evacuated spaces. Then a sheet of synthetic resin of the kind made by polymerizing ethylene with vinyl acetate is applied. The synthetic resin sheet is preferably 0.025 mm. thick. Chemically it is believed to be a poly-ethylene-oxide. The sheet is intended to project beyond the edge of the circular rock salt lens by 1 to 2 mm. so that when a close-fitting brass ring having an internal shoulder is slipped over the compound lens, the sheet is held firmly in place.

*Equivalent B.*—A sheet of partially saturated rubber hydrochlorides of 0.02 mm. thickness is substituted for the synthetic resin film in the preceding paragraph. The procedure is the same.

*Equivalent C.*—Some of the liquid known as Stock Solution B is poured on the horizontal top surface of a polished rock-salt plate, mounted axially on the vertical shaft of an electric motor. The speed of rotation is the lowest (less than 10 per second) which will yield a flat layer of liquid at the center of the plate. This speed is maintained for about 20 seconds (to give the benzene an opportunity to evaporate somewhat), whereupon the speed is increased greatly to fling off the thick layer of liquid at the edge. The rock-salt plate and coating are laid on a cold metal plate which is heated gradually to a temperature of about 120° C., when the system is laid on a stone slab and is allowed to cool to room temperature slowly. Since a single coat does not offer adequate protection, a second, and possibly, a third coat must be applied. To be sure, if one waits 5-6 days, the self-vulcanizing rubber will have become insoluble in benzene so that a second coat may be flowed on the first without dissolving the latter. To avoid so great a delay, an extremely thin film of nitrocellulose is spread over the top of the first coat. This is accomplished by allowing a drop of a dilute solution of nitrocellulose in amyl acetate to spread out on a water-surface. When the volatiles have evaporated, the film should show brilliant first-order interference colors. The film is lifted off the water by means of a square metal plate measuring 3 x 3 inches, with a circular central hole 2" in diameter. While the rock-salt plate is still very hot after the first heating, but below the decomposition point of nitrocellulose, the dry nitrocellulose film is laid on the coating so that no air-bubbles are formed. When this system has cooled down to room temperature, a second coat of stock solution B may be applied. It is to be emphasized that the total thickness of coating ought to be no less than 0.03 mm. After the last coat has been applied, a final layer of nitrocellulose may be applied to improve the optical polish of the surface. Since straight nitrocellulose frills upon prolonged exposure to saturated water-vapor, it is advisable to add a little paraffin to the nitrocellulose solution from which the last film is formed.

Films thus formed protect rock-salt against saturated water-vapor for more than 24 hours, and against water-drops for more than two hours. The overall transmission in the wavelength interval 8-12 mu is better than 70 per cent.

The equivalents are preferred in the same order that they are discussed.

The invention claimed is:

1. The method of protecting the surface of a lens which is made from a salt of silver normally decomposible at the surface thereof by ultra-violet light, which comprises vaporizing in a high vacuum a protective coating chemical selected from the group consisting of antimony trisulfide and amorphous elemental selenium, condensing the vapors thereof upon the surfaces of said lens and continuing the process until the lens appears deep orange to red by transmitted light, whereby said lens is light-proofed against ultra-violet rays.

2. The method set forth in claim 1 in which the salt from which the lens is made is silver chloride.

3. The method of making a silver chloride lens insensitive to ultra-violet light which comprises vaporizing antimony trisulfide in a high vacuum, condensing the antimony trisulfide vapors upon the surfaces of said lens and continuing the process until the lens appears deep orange to red by transmitted light, whereby said lens is light-proofed against ultra-violet rays.

AUGUST HERMAN PFUND.

References Cited in the file of this patent

UNITED STATES PATENTS

| Number | Name | Date |
|---|---|---|
| 2,175,016 | Brunke | Oct. 3, 1939 |
| 2,281,474 | Cartwright et al. | Apr. 28, 1942 |
| 2,337,329 | Hewlett | Dec. 21, 1943 |
| 2,512,257 | Pfund | June 20, 1950 |